(12) United States Patent
Van Dine

(10) Patent No.: US 6,963,151 B2
(45) Date of Patent: Nov. 8, 2005

(54) COMPOSITE LAMINA ARRANGEMENT FOR CANNING OF MOTORS

(75) Inventor: Pieter Van Dine, Mystic, CT (US)

(73) Assignee: Electric Boat Corporation, Groton, CT (US)

( * ) Notice: Subject to any disclaimer, the term of this patent is extended or adjusted under 35 U.S.C. 154(b) by 97 days.

(21) Appl. No.: 10/067,048

(22) Filed: Feb. 4, 2002

(65) Prior Publication Data

US 2003/0146670 A1 Aug. 7, 2003

(51) Int. Cl.[7] .............................................. H02K 5/10
(52) U.S. Cl. ......................... 310/87; 89/43; 89/156.28; 89/156.33; 89/85
(58) Field of Search .............................. 310/43, 85–89, 310/156.28, 156.33, 156.31, 261, 271, 54; 417/423.4, 423.7; 138/174, 153

(56) References Cited

U.S. PATENT DOCUMENTS

| | | | | |
|---|---|---|---|---|
| 2,642,920 A | * | 6/1953 | Simon et al. ................ | 442/226 |
| 3,470,917 A | * | 10/1969 | Grosh ......................... | 138/145 |
| 3,577,024 A | * | 5/1971 | Inagaki et al. ................ | 310/54 |
| 3,607,511 A | * | 9/1971 | Grosh ......................... | 156/173 |
| 3,623,930 A | * | 11/1971 | Grosh ......................... | 156/250 |
| 4,171,238 A | | 10/1979 | Sadler et al. ................ | 156/173 |
| 4,370,899 A | * | 2/1983 | Swartout ..................... | 74/572 |
| 4,433,261 A | * | 2/1984 | Nashiki et al. ........ | 310/156.28 |
| 4,450,873 A | * | 5/1984 | Sadler et al. ................ | 138/174 |
| 4,633,113 A | * | 12/1986 | Patel ...................... | 310/156.28 |
| 4,674,178 A | * | 6/1987 | Patel ............................ | 29/598 |
| 4,910,861 A | | 3/1990 | Dohogne ..................... | 29/598 |
| 4,930,201 A | | 6/1990 | Brown ........................ | 29/598 |
| 4,973,872 A | | 11/1990 | Dohogne ............... | 310/156.28 |
| 5,122,704 A | * | 6/1992 | Blakeley et al. ............... | 310/54 |
| 5,200,662 A | | 4/1993 | Tagami et al. .............. | 310/261 |
| 5,477,092 A | * | 12/1995 | Tarrant ........................ | 310/43 |
| 5,717,263 A | * | 2/1998 | Cox ........................... | 310/261 |
| 5,990,247 A | * | 11/1999 | Terada et al. ................ | 310/208 |
| 6,069,421 A | * | 5/2000 | Smith et al. ................... | 310/43 |
| 6,084,330 A | * | 7/2000 | Fisher et al. .................. | 29/598 |
| 6,104,115 A | | 8/2000 | Offringa et al. ........ | 310/156.28 |
| 6,150,747 A | * | 11/2000 | Smith et al. ................ | 310/258 |
| 6,240,971 B1 | * | 6/2001 | Monette et al. ............. | 138/153 |
| 6,452,301 B1 | * | 9/2002 | Van Dine et al. ....... | 310/156.12 |
| 6,454,547 B1 | * | 9/2002 | Kohlhaas et al. ........... | 417/353 |
| 6,508,145 B1 | * | 1/2003 | Gabrys ....................... | 310/261 |
| 6,751,842 B2 | * | 6/2004 | Roesel, Jr. et al. ........... | 29/598 |

FOREIGN PATENT DOCUMENTS

| | | | | | |
|---|---|---|---|---|---|
| JP | 62262643 A | * | 11/1987 | ......... | H02K/21/08 |
| JP | 03049544 A | * | 3/1991 | ............ | H02K/1/27 |
| JP | 03143238 A | * | 6/1991 | ............ | H02K/1/27 |
| JP | 04017545 A | * | 1/1992 | ......... | H02K/5/132 |
| JP | 04368440 A | * | 12/1992 | ............ | H02K/1/27 |
| JP | 07245921 A | * | 9/1995 | ......... | H02K/15/02 |

* cited by examiner

*Primary Examiner*—Darren Schuberg
*Assistant Examiner*—Yahveh Comas
(74) *Attorney, Agent, or Firm*—Michael J. Bell; Howrey LLP

(57) ABSTRACT

In the embodiments described in the specification, an electric motor has a stator and a rotor and a wrap layer includes composite lamina arrangement containing a liquid barrier with a veil cloth and a chopped strand mat resin layer, a strength element containing a hoop wrap including a polymeric resin layer with continuous fibers extending circumferentially around the rotor and another polymeric resin layer with fibers extending helically, a liquid barrier having a veil cloth and a chopped strand mat resin layer and another strength element including a polymeric resin layer with continuous fibers extending circumferentially around the rotor. The outer surface of the composite lamina arrangement may be corrugated to promote or inhibit flow of liquid through the space between the stator and the rotor.

13 Claims, 4 Drawing Sheets

COMPOSITE LAMINA ARRANGEMENT FOR CANNING OF MOTORS

BACKGROUND OF THE INVENTION

This invention relates to canning of electric motors for use in submerged operation.

Conventional motor rotors and stators are canned using non-magnetic metallic material. Often sheet metal having a thickness of 0.025 inch or more is used on the periphery of the motor rotor and on the interior surface of the motor stator. Magnetic flux passing between the rotor and the stator introduces eddy currents in conductive material such as metallic canning material that reduce the motor efficiency and, in some cases, require an increase in the size of the motor. Heretofore, such eddy current losses have been overcome by encapsulating the rotor and stator in a single layer of composite material but this has been found inadequate to provide sufficient resistance to leakage while also providing the necessary strength to resist damage.

The Blakeley et al. U.S. Pat. No. 5,122,704 discloses a composite rotor sleeve arranged to preclude flow of liquid between a liquid-cooled rotor and the air gap between the rotor and the stator in an electric motor while preventing relative movement between the sleeve and the rotor as a result of thermal cycling. For this purpose the sleeve, which is preferably pre-fabricated and applied with an interference fit onto the rotor, is made up of a radially inner component which is continuous film of polyimide material and may be a helically wound ribbon sealed with a polyimide adhesive and a cylindrical element formed of a plurality of plies of wound fibrous material such as carbon fiber with each ply being impregnated in a resin matrix. Preferably, the resin is a polyimide resin to provide high temperature resistance. In a preferred embodiment, the cylindrical element has twelve plies, eight being wound generally circumferentially to provide a high measure of hoop strength and the remaining four being wound at a pre-determined angle to prevent generation of thermally induced stresses or relative movement between the sleeve and the rotor. The combined fibrous layers provide the strength to hold the rotor components in position while the continuous film layer precludes flow of liquid between the rotor component and the space between the rotor and stator.

The Smith U.S. Pat. No. 6,069,421 discloses an electric motor having a composite encapsulated stator and a composite encapsulated rotor, each of which is enclosed in a canning layer of high strength resin containing high modulus fibers, such as fiberglass, graphite, carbon, boron, quartz or aramid fiber material, combined with a metallic backing ring on the side away from the magnetic flux field extending between the rotor and the stator.

The Dohogne U.S. Pat. No. 4,973,872 discloses a rotor assembly having a plurality of magnets encapsulated by an outer molded plastic cylindrical sleeve having runners which extend into channels in the rotor core. The plastic sleeve may be a fiberglass-filled plastic material.

According to the Brown U.S. Pat. No. 4,930,201, a permanent magnet rotor is surrounded by a sleeve made of composite material which includes high strength, high modulus fibers such as fiberglass, graphite, boron and kevlar embedded in an epoxy or other plastic matrix which may be made by wet winding of high strength filaments onto the rotor assembly followed by curing or by forming the composite sleeve on a mandrel and subsequently shrinking it onto the rotor.

The Patel U.S. Pat. Nos. 4,633,113 and 4,674,178 disclose permanent magnet rotors surrounded by a body of cured fibrous material formed by winding a fiber such as carbon fiber in a curable resin such as epoxy resin circumferentially about the rotor structure and curing the epoxy material, which may be followed by application of a layer of epoxy resin to the outer surface which is then cured.

In the Nashiki et al. U.S. Pat. No. 4,433,261 a permanent magnet rotor is bound with non-magnetic fibers such as glass fiber or carbon fiber and then secured with resin to prevent peeling off of the magnets.

SUMMARY OF THE INVENTION

Accordingly, it is an object of the present invention to provide a composite lamina arrangement for canning electric motors which overcomes the disadvantages of the prior art.

Another object of the invention is to provide a composite lamina arrangement for canning of electric motors which has improved resistance to leakage and damage.

These and other objects of the invention are attained by providing a composite lamina arrangement containing a plurality of composite water barrier layers interspersed with at least one strength layer containing directional fibers embedded in a resin material. In a preferred embodiment, a composite lamina arrangement for canning a motor component such as a rotor includes an inner liquid barrier containing a veil cloth layer and a chopped strand mat resin layer surrounded by a strength layer containing a hoop wrap with high strength, high resin modulus directional fibers embedded in resin and extending circumferentially around the rotor and another resin layer containing embedded directional fibers extending around the rotor in a helical direction followed by an outer liquid barrier containing a veil cloth layer and a chopped strand mat resin layer surrounded by another strength element consisting of a hoop wrap with circumferentially oriented high strength, high resin modulus directional fibers embedded in a resin layer.

Preferably the fibers used in the strength elements are selected from glass, aramid, carbon, polyester and quartz families and the layers are produced by a sequence of manufacturing operations chosen from dry lay-up, resin transfer molding, and wet or pre-impregnated filament winding techniques.

The exposed surface of the composite lamina arrangement of the invention can be provided with a corrugation pattern containing ridges arranged to inhibit or promote the flow of liquid through the space between the stator and the rotor.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
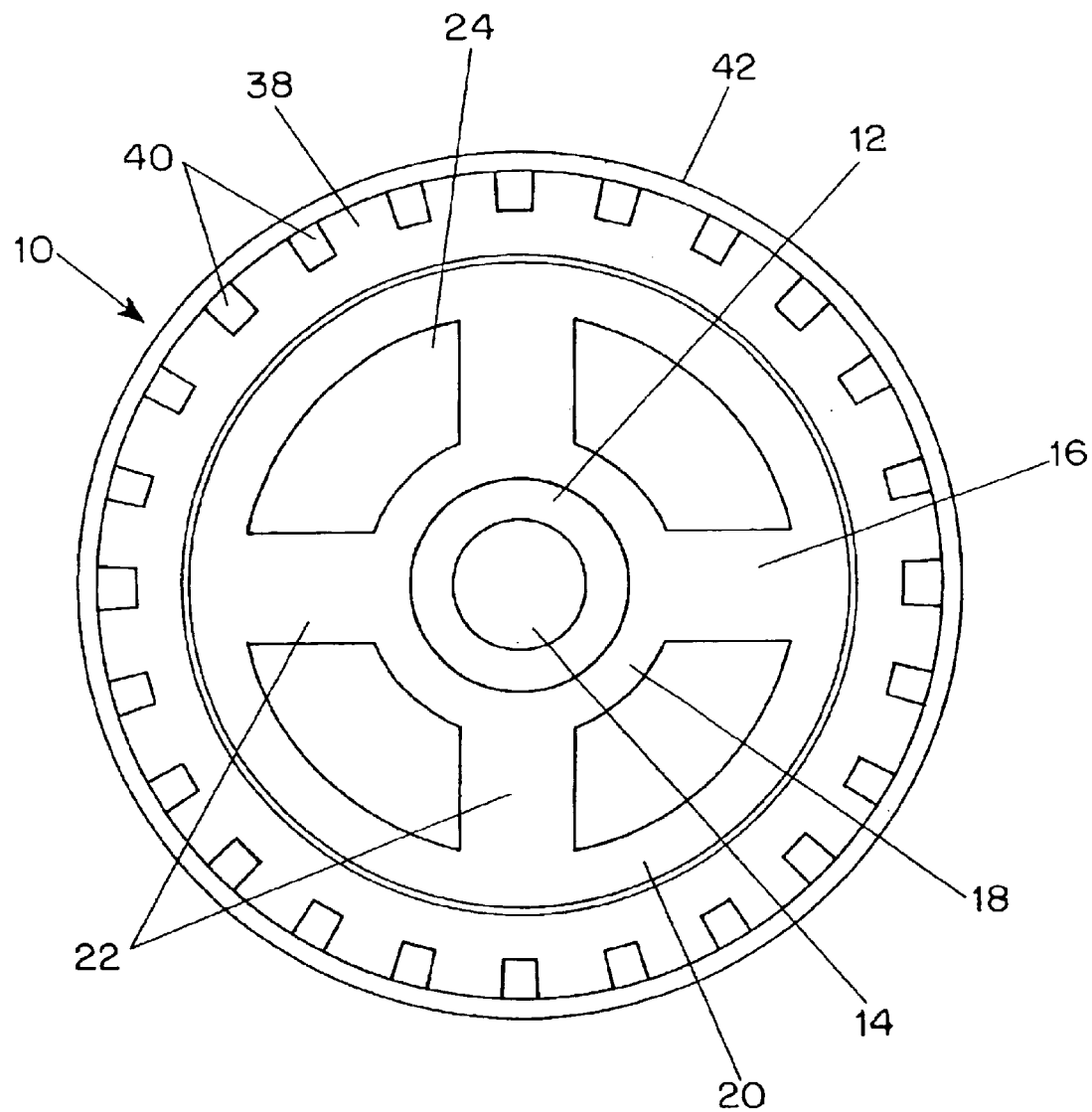
FIG. 1 is a schematic side view illustrating a representative embodiment of a rotor for an electric motor having a composite lamina canning arrangement in accordance with the invention.
Figure 2:
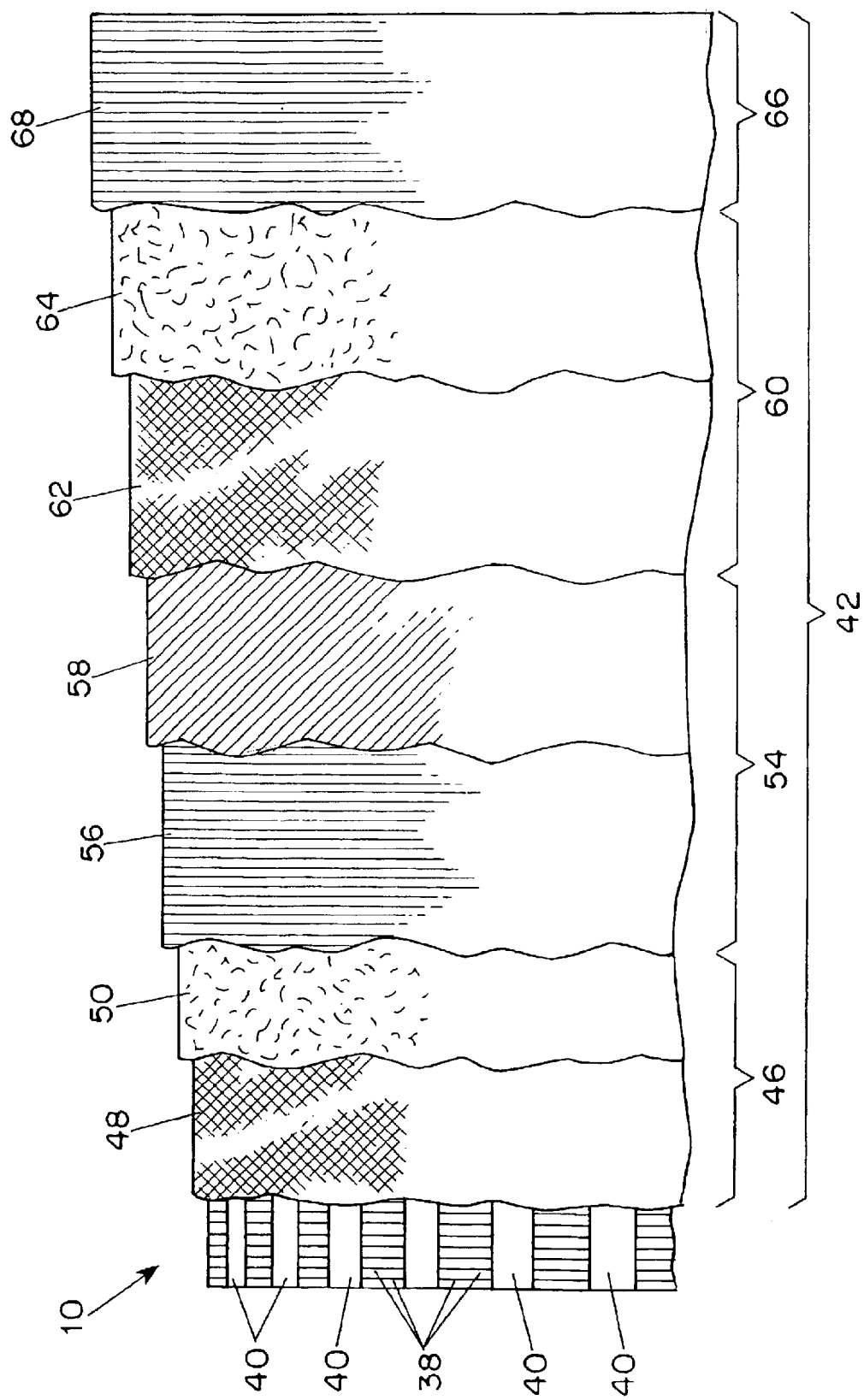
FIG. 2 is a fragmentary side view of the rotor shown in FIG. 1 with successive layers of the composite lamina canning arrangement broken away.

In the representative embodiment illustrated in FIGS. 1 and 2, a rotor 10 for an electric motor has a steel hub 12 with a central opening 14 to receive an axial mounting shaft and carries a composite disk 16 consisting of inner and outer annular members 18 and 20, respectively, connected by four radial arms 22 which are separated by open spaces 24. The periphery of the disk 16 is surrounded by an array of permanent magnets 40 supported in peripheral recesses in an assembly of circular laminations 38 of ferromagnetic material.

In order to provide canning for the rotor 10 to protect it from intrusion of liquid while providing strength to resist damage in accordance with the invention, the rotor has a rigid outer wrap 42 comprising a composite lamina arrangement which is illustrated in detail in FIG. 2.

In FIG. 2 the successive layers of the lamina arrangement in the rigid outer wrap 42 are broken away to show the arrangement of the layers. On the inner side, in contact with the magnets 40 and ferromagnetic elements 38, a liquid barrier 46 which is imperious to liquids contains a veil cloth 48 surrounded by a chopped strand mat 50. The veil cloth 48, which may have a thickness of about 0.010 inch, is a sheet of non-woven fibers such as spun bonded glass, carbon or polyester fibers of the type commercially marketed by BBA Group PLC under the trademark REEMAY, and the chopped strand mat 50 is a sheet of polymeric resin material having embedded chopped fibers which may be, for example, fiberglass, graphite, carbon, boron, quartz or aramid fibers, providing high temperature resistance, flame resistance and electrical resistance properties as well as providing a sealing barrier to prevent liquid from reaching the rotor when the motor is immersed in a liquid environment.

Surrounding the liquid barrier 46 is a strength element 54 containing a hoop wrap 56 consisting of a resin layer in which continuous fibers extending circumferentially around the rotor are embedded and another resin layer 58 in which continuous fibers are wound in a helical direction at an angle of about 45 degrees to the axis of the rotor. The hoop wrap 56 may have a thickness of about 0.020 inch and the helically wound layer 58 may have a thickness of about 0.030 inch and in each case the fibers embedded in the resin layer are high strength, high modulus fibers such as fiberglass, graphite, carbon, boron, quartz and aramid fibers.

Surrounding the strength element 54 is another liquid barrier 60 which is impervious to liquids and consists of a veil cloth 62 covered by a chopped strand mat 64 which may have the same construction as the veil cloth 48 and chopped strand mat 50 respectively, discussed above.

Surrounding the liquid barrier 60 is another strength element 66 which, in the present embodiment, consists of a single resin layer 68 containing embedded continuous circumferentially wound high strength, high modulus fibers such as fiberglass, graphite, carbon, boron, quartz and aramid fibers, for example, of the same type described above with respect to the hoop wrap 56. Preferably the hoop wrap layer 68 has a thickness of about 0.015 inch.

With this rigid composite lamina arrangement, structural integrity and rigidity of the rotor 10 is assured while providing high resistance to liquid penetration for submerged operation and high strength to resist damage from impact by other objects, for example, and to assure circular uniformity of the outer surface of the rotor. Moreover, since no metallic materials are included in the composite lamina arrangement, there is no interference with magnetic flux passing between the rotor and a surrounding stator member in an electric motor. Because the composite lamina arrangement is made of fiber reinforced rigid material it is resistant to damage and a small but accurate uniform dimension of the space 80 between the rotor and the stator 82 can be maintained during operation.

FIGS. 3–6 illustrate composite lamina arrangements of the type described above provided with corrugations in the exposed surface to promote or inhibit flow of liquid through a space 80 between a rotor 10 and an adjacent stator 82 of an electric motor.

Figure 3:
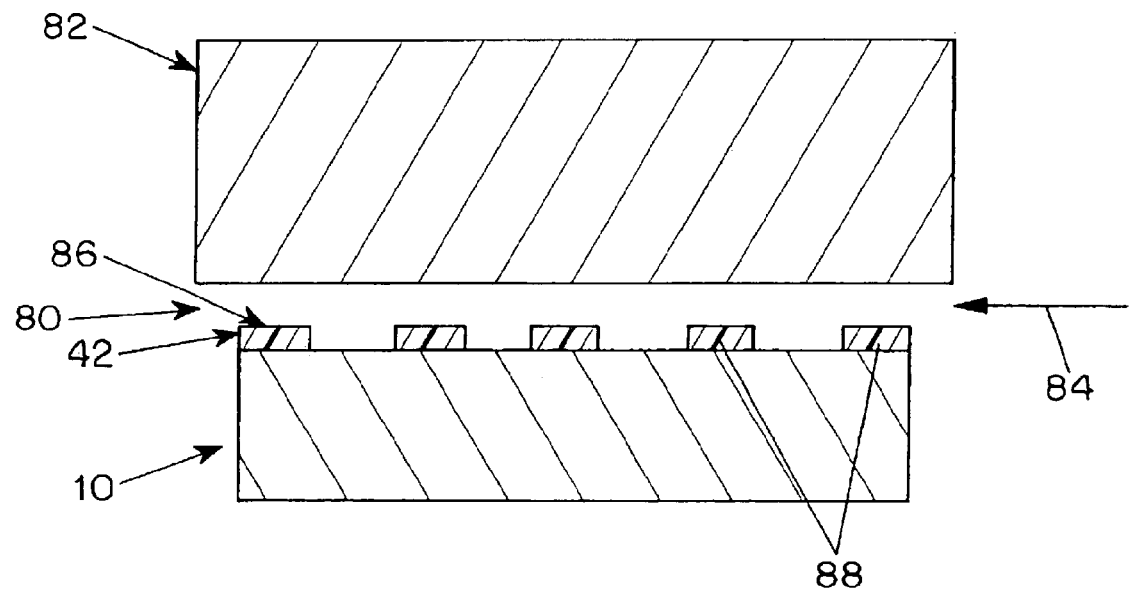
FIG. 3 is a fragmentary cross-sectional view illustrating a corrugation pattern formed in the surface of the composite lamina arrangement oriented to inhibit flow of liquid through the space between the rotor and an adjacent stator.
Figure 4:
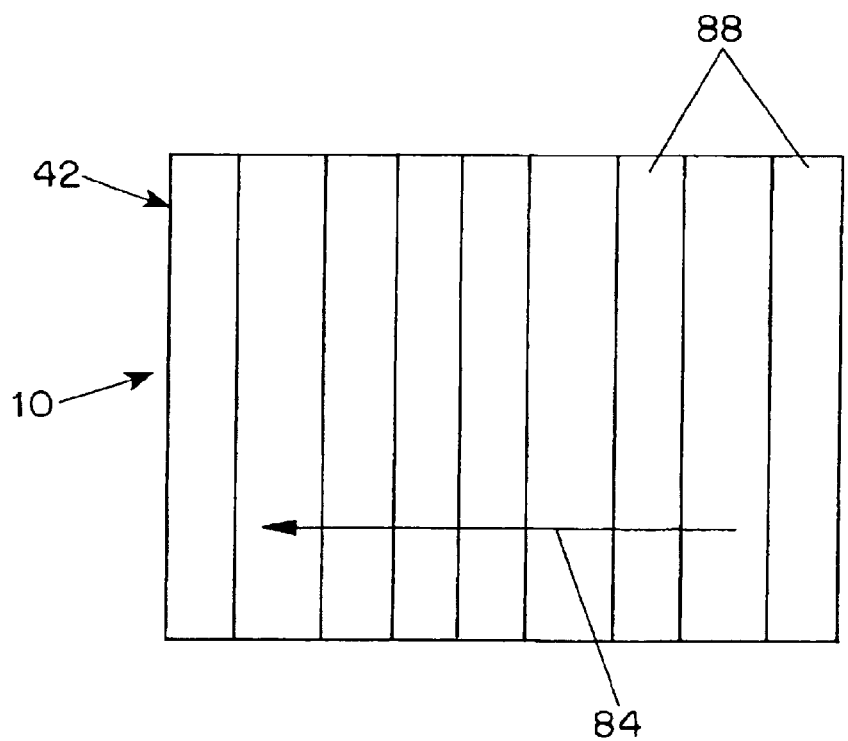
FIG. 4 is a fragmentary plan view illustrating the corrugation pattern shown in FIG. 3.

In order to inhibit flow of liquid through the space 80 in a direction 84 between the outer surface of the rotor 10 and the inner surface of the stator 12, FIGS. 3 and 4 show the exposed surface 86 of a composite lamina arrangement 42 formed with a corrugation pattern consisting of parallel ridges 88 which extend circumferentially around the outer surface of the composite lamina arrangement so as to inhibit flow of liquid through the gap 80 between the stator and the rotor.

Figure 5:
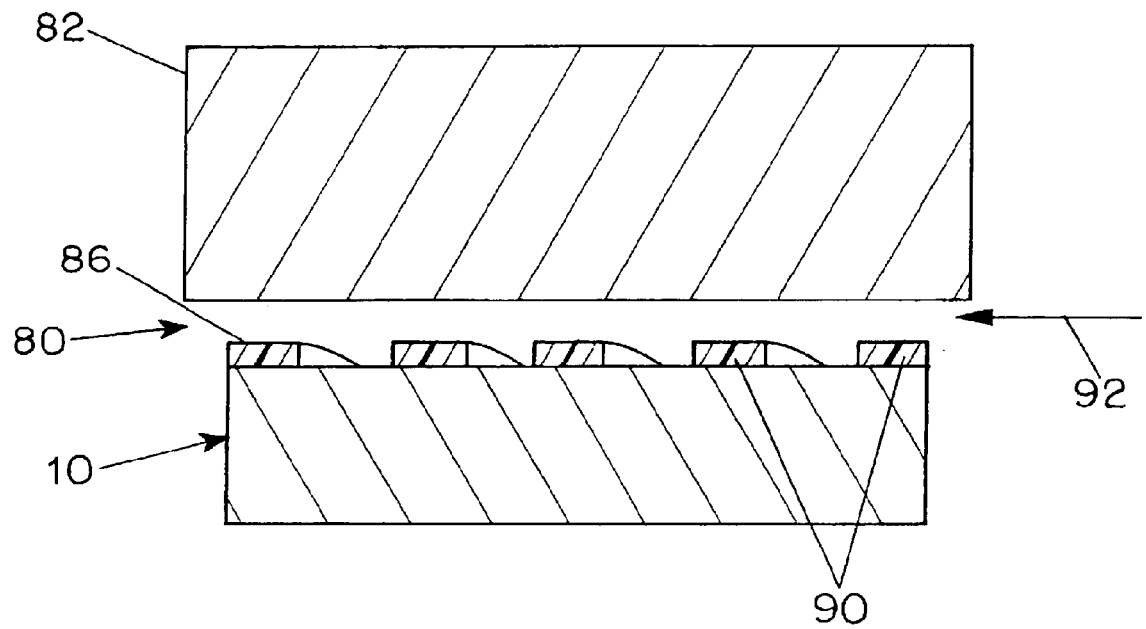
FIG. 5 is a fragmentary cross-sectional view illustrating a corrugation pattern formed in the surface of the composite lamina arrangement oriented to promote flow of liquid through the space between the rotor and the stator.
Figure 6:
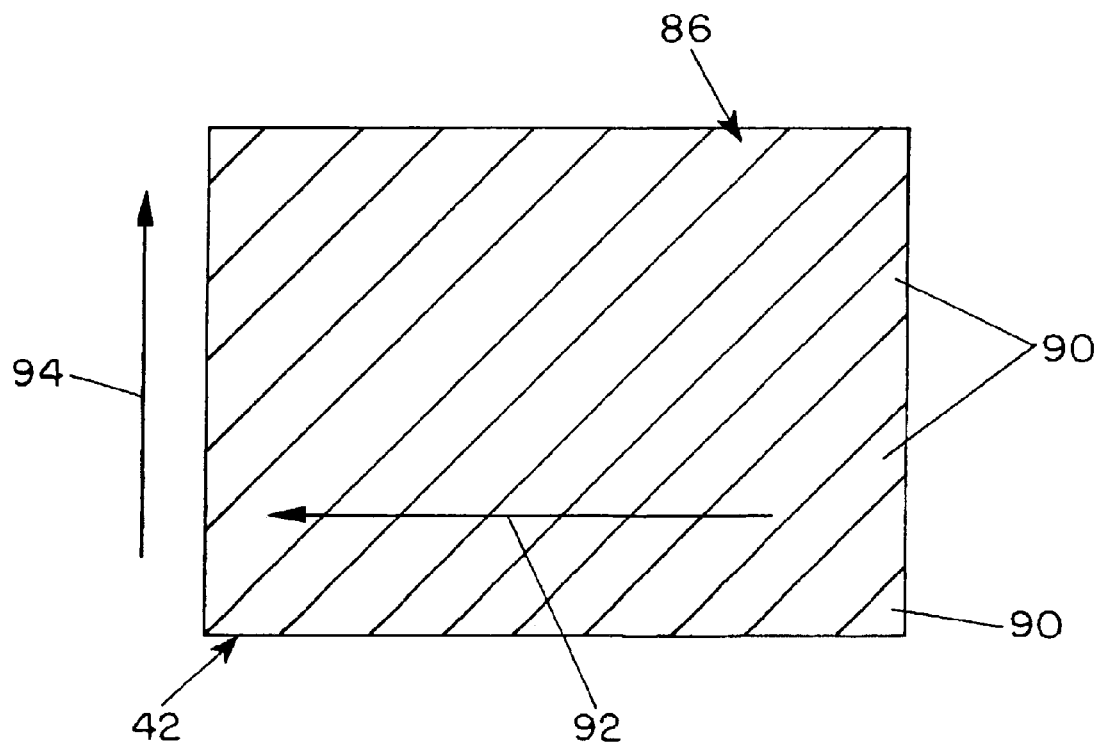
FIG. 6 is a fragmentary plan view of the surface of the composite lamina arrangement shown in FIG. 5.

In another embodiment, illustrated in FIGS. 5 and 6, the corrugation pattern formed in the outer surface of the composite lamina arrangement 42 consists of a series of parallel ridges 90 extending helically around the axis of the rotor, thereby promoting flow of liquid in the direction 92 through the space 80 between the stator and rotor as the rotor rotates in the direction 94. By providing an appropriately oriented corrugation pattern on the surface of the composite lamina arrangement, the flow of liquid through the space 80 which provides cooling for the motor can be manipulated and used as a design parameter.

Although the invention has been described herein with reference to specific embodiments, many modifications and variations therein will readily occur to those skilled in the art. Accordingly, all such variations and modifications are included within the intended scope of the invention.

I claim:

1. An electric motor comprising:

a stator;

a rotor supported for rotation within the stator; and a composite lamina arrangement provided on a surface of at least one motor component selected from the rotor and the stator comprising:

(a) a first liquid barrier which is impervious to liquids comprising at least one layer of polymeric resin material containing reinforcing fibers wherein the first liquid barrier includes a veil cloth containing spun bonded polymeric fibers and a mat of chopped fibers embedded in a polymeric resin layer;

(b) a strength element surrounding the first liquid barrier, and including at least one layer of polymeric resin material containing an array of continuous high strength, high modulus fibers extending continuously around the motor component; and (c) a second liquid barrier which is impervious to liquids surrounding the strength element and comprising at least one polymeric resin material containing reinforcing fibers.

2. An electric motor according to claim 1 wherein the composite lamina arrangement further includes a strength element surrounding the second liquid barrier including at least one layer of polymeric resin material containing high strength, high modulus fibers extending continuously around the circumference of the motor component.

3. An electric motor according to claim 1 wherein the strength element includes a first layer of polymeric resin material containing high strength, high modulus fibers extending continuously around the motor component in a substantially circumferential direction and a second layer of polymeric resin material containing high strength, high modulus fibers which extend around the circumference of the motor component in a helical direction.

4. An electric motor according to claim 1 wherein the second liquid barrier includes a veil cloth containing spun-bonded polymeric fibers and a mat of chopped fibers embedded in a polymeric resin layer.

5. An electric motor according to claim 1 wherein the composite lamina arrangement has an exposed surface formed with a corrugation pattern to control the flow of liquid through the space between the rotor and the stator.

6. An electric motor according to claim 5 wherein the corrugation pattern contains ridges which extend circumferentially around the exposed surface to inhibit flow of liquid through the space between the rotor and the stator.

7. An electric motor according to claim 5 wherein the motor component is a rotor and wherein the ridges in the corrugation pattern extend at an angle to a plane perpendicular to the axis of the rotor to promote flow of liquid through the space between the rotor and the stator.

8. An electric motor according to claim 1 wherein the fibers in the strength element are selected from the group consisting of glass, aramid, carbon, polyester and quartz fibers.

9. An electric motor according to claim 1 wherein the layers of the composite lamina arrangement are made by a technique selected from the group consisting of dry lay-up, resin transfer molding, and wet and pre-impregnated filament winding techniques.

10. A composite lamina arrangement for canning an electric motor component comprising:

a first liquid barrier comprising at least one layer of polymeric resin material containing reinforcing fibers wherein the first liquid barrier includes a veil cloth containing spun bonded polymeric fibers and a mat of chopped fibers embedded in a polymeric resin layer;

a strength element adjacent to the first liquid barrier including at least one layer of polymeric resin material containing an array of continuous high strength, high modulus fibers; and a second liquid barrier adjacent to the strength element comprising at least one polymeric resin layer containing reinforcing fibers.

11. A composite lamina arrangement according to claim 10 wherein the composite lamina arrangement further includes a second strength element adjacent to the second liquid barrier and including at least one layer of polymeric resin material containing continuous, high strength, high modules.

12. A composite lamina arrangement according to claim 10 wherein the strength element includes a first layer of polymeric resin material containing continuous fibers extending in a first direction and a second layer of polymeric resin material containing continuous fibers in a second direction at an angle to the first direction.

13. An electric motor according to claim 10 wherein the second liquid barrier includes a veil cloth containing spun bonded polymeric fibers and a mat of chopped fibers embedded in a polymeric layer.

* * * * *